Sept. 6, 1938.   R. C. BENNER ET AL   2,128,907
METHOD OF MAKING ABRASIVE COATED MATERIAL
Filed Oct. 8, 1936
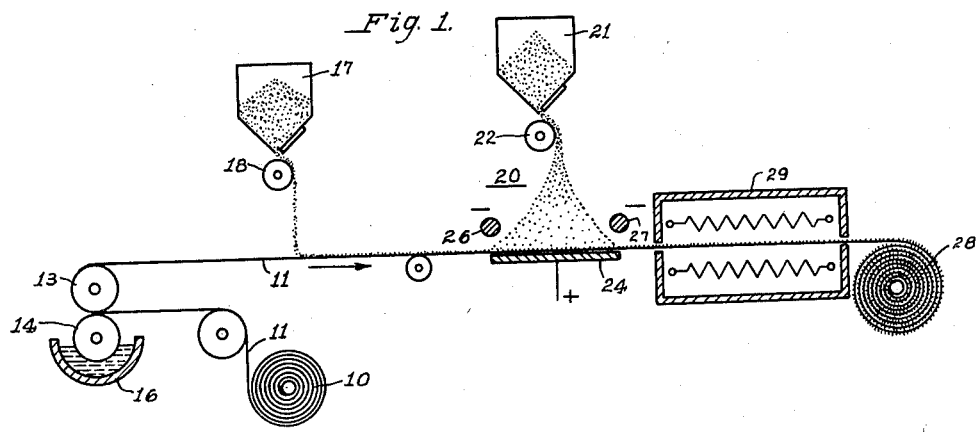
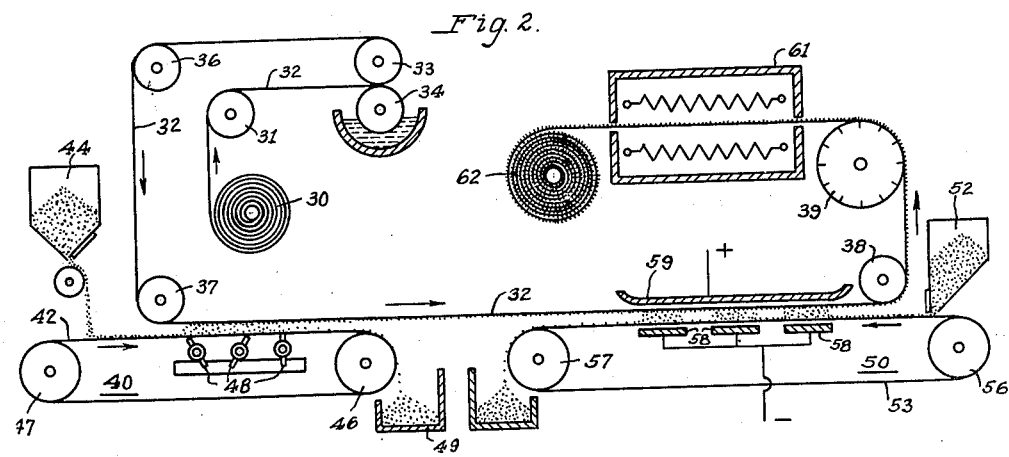
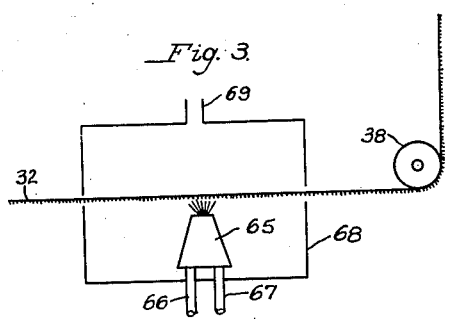
INVENTORS.
RAYMOND C. BENNER
ROMIE L. MELTON
BY
ATTORNEY.

Patented Sept. 6, 1938

2,128,907

UNITED STATES PATENT OFFICE 2,128,907

METHOD OF MAKING ABRASIVE COATED MATERIAL

Raymond C. Benner and Romie L. Melton, Niagara Falls, N. Y., assignors, by mesne assignments, to The Carborundum Company, Niagara Falls, N. Y., a corporation of Delaware Application October 8, 1936, Serial No. 104,736

4 Claims. (Cl. 51—278)

The present invention relates to improved methods of fabricating granular coated material and particularly to simplified methods of manufacturing abrasive sheet material including the treating thereof and especially the manner by which a sizing material is applied to abrasive coated sheet material.

The usual method of fabricating abrasive sheet material involves an application of a liquid adhesive, such as fluid glue to a suitable backing after which a coating of abrasive granules is applied by any one of several well known methods. A further operation in the manufacture of abrasive paper or cloth includes the application of a sizing coat of adhesive to the abrasive surface. The conventional practice in carrying out the sizing operation has been to apply a liquid adhesive such as glue to the abrasive granules to securely affix the same to the backing material. Another method employed in the formation of abrasive paper or cloth, and particularly when the granules which are to be used to form the abrasive surface are of a fine grit size, has been to mix the grain with a liquid adhesive and apply the mixture to a surface of sheet backing material.

Where either of the older methods is employed, the abrasive article is subject to the disadvantage of having the tips or outer portions of the abrasive granules to some degree coated with the adhesive and the sharpness and cutting ability of the article is accordingly reduced. The use of a liquid adhesive as the sizing coat necessitates the drying of the abrasive coated material to remove solvent from the first adhesive coating and the drying or curing operation requires apparatus for arranging the paper or cloth in a festooned fashion. The drying operation is necessarily prolonged and considerable storage space is required to store the abrasive material during the curing thereof. After the solvent has been removed from the first adhesive or when the same has been permitted to properly set the sizing coat may be applied. If a liquid adhesive such as glue is employed as the sizing material the paper or cloth must again be festooned and stored to permit the glue to harden before the finished sheet abrasive may be rolled or assembled in a compact manner. Other types of sizing adhesives such as synthetic resins which are not soluble in water are often employed to fix the grain to sheet material and the curing of this general type of sizing coat involves even more elaborate methods and equipment which materially contributes to the inefficient and uneconomical production of such abrasive coated material.

It is therefore an object of the present invention to provide a method of fabricating abrasive material which will eliminate the prolonged drying operations required to remove the solvent from the two coats of liquid adhesive and particularly to render the drying of the base adhesive coat unnecessary before applying the sizing material.

Another object of the invention is to devise a method of applying a sizing material to abrasive coated material which will not cover the tips of the abrasive grain, and accordingly not interfere with the cutting ability of the finished abrasive article.

A still further object of the invention is to provide a method of applying a sizing material around the base portion of abrasive granules without disturbing a predetermined arrangement of the abrasive particles such as an oriented arrangement thereof.

In the accompanying drawing,

Figure 1 is a diagrammatic view of apparatus for carrying out one method of applying a sizing coat to an uncured abrasive coated web.

Figure 2 is a diagrammatic view of modified apparatus that may be utilized in carrying out another method of sizing abrasive coated material.

Figure 3 is a diagrammatic view of mechanical apparatus for projecting adhesive material onto a granular coated surface.

Referring to the drawing, there is shown at 10 a reel or roll of sheet web material such as paper or cloth mounted in such a manner as to permit the web 11 to pass over an idler roll 12 and between a pair of adjacently mounted rolls 13 and 14. The roll 14 is mounted in such a manner that a coating of liquid adhesive is carried by the periphery thereof from a receptacle 16 to a surface of the web 11. After the web material has been properly coated by the adhesive, abrasive granules may be distributed evenly over the adhesively coated surface by any suitable means as for example by supporting the web in a horizontal manner with the adhesively coated surface facing upwardly and moving the web substantially in the direction of the length thereof beneath a receptacle or hopper 17. A roll 18 may be provided to be rotated below the hopper discharge to properly spread the abrasive particles uniformly over the adhesive surface.

The web 11 carrying the abrasive coating deposited thereon from the hopper 17 is moved further in a horizontal manner and in the direction indicated by the arrow to the sizing apparatus indicated generally at 20. The sizing apparatus should be positioned in such a manner that the sizing or reinforcing coat of adhesive will be applied immediately after the abrasive granules have been distributed on the web and while the base or first coating of adhesive is still moist or tacky. The sizing apparatus may take any of a number of forms or arrangements of parts as long as powdered sizing material may be properly dispersed during the projection or distribution thereof onto the granular surface. Any of the usual adhesives that can be powdered may be employed as the sizing material, and a pulverized synthetic resin such as a phenol formaldehyde condensation product has been found to be particularly adaptable.

The powdered sizing material may be stored in a suitable receptacle or hopper 21 and discharged over a rotating drum 22 to properly spread the powdered particles in an even stream extending transverse of the moving abrasive coated web 11. The powdered sizing material will fall in a thin stream by the force of gravity and if unaltered the powdered particles would impinge upon a relatively small area of the abrasive surface of the web 11. It has been found that the particles of powdered adhesive such as suitable resins tend to cling to each other and small balls of pulverized material are formed in the ordinary course of manipulation such as filling the hopper 21 and moving the material therefrom by the drum 22. It is therefore necessary to break up the lumps or balls of the powdered sizing material and disperse the same in a finely divided state prior to deposition on the abrasive surface. An electrostatic field has been found to be particularly desirable to disperse and project the sizing particles into the interstices of the abrasive surface. A plate electrode 24 is therefore arranged below the traveling web 11 which is connected to one side and preferably the positive terminal of a relatively high potential direct current supply circuit. A pair of rod or pipe shaped electrodes 26 and 27 of relatively small diameter are arranged above the web and extend in a parallel spaced relation across the web. The electrodes 26 and 27 should be connected to the negative side of the high potential circuit and an electrostatic field will therefore be established between the plate 24 and the electrodes 26 and 27. The electrodes 26 and 27 should be arranged in a spaced relation above the traveling web 11 to permit the falling powdered sizing material to pass between the two. The electrostatic lines of force set up by such an arrangement and shape of electrodes will be in the nature of a dual point to plate field. That is to say, the electrostatic lines of force will be concentrated in a divided relation at the electrodes 26 and 27, but spread over a respective portion of the surface of the plate electrode 24. As the falling powdered sizing particles reach the electrostatic field each individual particle acquires a negative electrical charge. The individual particles which may be clinging to each other in ball form are all negatively charged and therefore repel each other to disperse the pulverized material into the original fine powdered state. The negatively charged particles are repelled by the electrodes 26 and 27 and attracted by the positive plate electrode 24. The powdered particles are thus drawn into the interstices of the abrasive surface by the joint action of gravity and the force of the electrostatic field, leaving the tips or upper portion of the abrasive granules substantially free of the powdered material. The lines of force formed by the dual point to plate electrostatic field cause the powdered particles to spread so that the same is distributed over a relatively wide area at the point of contact with the abrasive surface. The spreading effect or the dispersed particles insures an even coat of the sizing material around the base portion of the abrasive granules. The electrostatic arrangement also provides peculiarly advantageous means of applying powdered sizing material such as pulverized resin, by reason of the fact that particles retain an electrical charge for an appreciable period and the attraction between such charged particles and an oppositely charged backing causes the powdered adhesive to be retained in the deposited position until the pulverized material becomes a part of the base adhesive bond.

As a result of this method of applying the sizing material, the powdered adhesive is forced to the base portion of the abrasive grain and by controlling the proportion of the powdered material escaping from the hopper 21 with respect to the speed of the traveling abrasive coated web 11 the quantity of sizing material applied may be regulated. The rate of discharge of the pulverized material from the receptacle or hopper 21 should be such that for a given speed of the web only the base portion of the abrasive granules will be embedded leaving the tip or work engageable portions thereof exposed.

The application of the sizing material while the first or base layer of adhesive is still moist or tacky eliminates the prolonged and undesirable drying or curing operation which has previously required the storage of the granular coated web in a festooned fashion for an appreciable period before a liquid sizing substance could be applied. The employment of a powdered sizing material permits the immediate application thereof and also expedites the curing of the base coat by reason of the fact that the pulverized material is substantially liquid free and accordingly absorbs a portion of the solvent of the liquid base adhesive.

After the coated web material 11 passes the sizing apparatus 20 the base and sizing adhesives are practically dry and the web may be stored in a compact manner for further drying or curing as by arranging the same into the form of a roll 28. The employment of a liquid adhesive for the base coat and a powdered adhesive for the sizing coat which are heat hardenable, such as heat reactive synthetic resins, provides the present method with the further advantageous feature of permitting the curing of both adhesives during one operation. An endless type heating chamber 29 may be provided for heating such adhesives so that the abrasive coated web will be emitted therefrom in the finished product form. The drying or heating chamber 29 may be of any well known type as for instance an electrical resistance type.

The present method of fabricating abrasive sheet material may be advantageously employed in manufacturing oriented abrasive paper or cloth. Diagrammatically illustrated in Figure 2, apparatus is shown for carrying out the improved process in connection with such a granular coated product. In this form the web sheet material is fed from a supply roll 30 over an idler roll 31 in the manner of a continuous web 32 between a pair of rolls or drums 33 and 34 for the purpose of applying a coating of a liquid adhesive to one surface thereof. After the adhesive has been applied by the partially immersed roll 34 the web 32 is moved over the guide rolls 36 and 37 so that the adhesively coated surface is positioned downwardly. The web 32 is supported in a horizontal manner with the adhesive coated surface facing down by threading the same from the roller 37 to a roll 38. The web material is moved from the supply roll 30 and around the various idler or guide rolls in the direction indicated by the arrows by a suction drum 39, so that the web is continuously moving and supported in the manner as above described.

Apparatus for applying or projecting abrasive granules into engagement with the adhesive coating is indicated generally at 40. The abrasive particles, mostly of an elongated character, are deposited on a feed belt 42 from a conventional type hopper 44. The feed belt may be supported in a horizontal manner and moved in the direction indicated by the arrow by means of a rotated drum 46 and an elongated rotatable pulley 47. The abrasive granules carried by the moving belt 42 may be projected upward in an oriented manner by any of a number of methods such as by striking the feed belt with a continuous series of sudden blows. One arrangement that will provide the granules with sufficient impetus to project the same upwardly is by means of a plurality of cams 48 which may be supported in a rotatable manner below the feed belt. The abrasive granules and particularly the elongated grains are caused to be oriented by the air in a manner similar to a moving arrow so that the ends strike and engage the adhesive under surface of the web while the more regular shaped granules, incapable of being oriented, encounter more air resistance and do not reach the web. A receptacle 49 may be provided at the end of the feed belt 42 to receive the more regular shaped and excess particles that return to the feed belt.

The abrasive granules engaging the base adhesive layer and hanging therefrom to maintain the orientation thereof are moved by the web 32 to the sizing apparatus indicated generally at 50. The present method also contemplates applying powdered sizing material immediately after the web has been granularly coated and while the base adhesive is still in a tacky condition. It is also desirable to maintain the base adhesive surface of the web 32 in the same position with the abrasive granules hanging downwardly therefrom to preserve the oriented arrangement thereof in the unset or uncured adhesive. The powdered sizing material should therefore be projected upwardly into engagement with the base adhesive to coat the base engaging portion of the granules without disturbing the inverted upstanding arrangement thereof. The powdered sizing material may be carried from a supply receptacle or hopper to a position beneath the granular coated web by means of a feed belt 53 moved in the direction indicated by the arrow and supported by the pulleys or rolls 56 and 57.

The individual particles of the powdered sizing material carried by the feed belt 53 are charged negatively by means of one or more plate electrodes 58 mounted adjacent the under surface of the feed belt and connected to the negative terminal of a relatively high potential supply. The negatively charged particles therefore repel each other and the sizing material is dispersed into a fine powdered state. The sizing apparatus also includes a plate electrode 59 positioned above the traveling web 32 which should be connected to the positive side of the high potential supply circuit. The negatively charged and dispersed particles of sizing material are attracted by the positive electrostatic charge of the electrode 59 and the same are thereby moved into engagement with the granular surface of the web 32. The breaking up or dispersion of the powered sizing materially adds to the evenness of the sizing coat and also permits the finely divided particles to move between the abrasive granules or to the base portion thereof. The web material 32 also becomes positively charged by the electrostatic field and the negatively charged powdered particles retain the electrostatic charge for an appreciable period so that the same are retained in the tacky base adhesive layer after the web 32 passes beyond the electric field. By controlling the speed of the traveling web 32 and the quantity of powdered sizing material delivered to the feed belt 53, the sizing coat may be applied in such a manner that only the base portion of the abrasive granules will be embedded leaving the tip portion thereof exposed to provide a sharp abrading surface for the finished product.

The powdered sizing material in contacting the tacky base adhesive absorbs a portion of the liquid contained in the base coat. By employing the proper proportions of appropriate adhesives for the base and sizing coat the combined adhesives upon passing the sizing apparatus 50 will be no longer moist or tacky so that the abrasive coated material may be arranged in a compact manner for treatment without destroying the oriented grain arrangement. The earlier methods of manufacturing oriented abrasive paper or cloth by projecting the granular material upwardly into engagement with a downwardly facing glue surface require that the paper or cloth be maintained in such a manner for a considerable period to permit the glue or adhesive to obtain a set to preserve the oriented grain arrangement. The present method of applying a powdered sizing material which absorbs the solvent from the base adhesive permits the web 32 to be moved from the downwardly facing position immediately after application of the sizing material which in turn is applied immediately subsequent to the grain coating operation. The usual precaution of maintaining the abrasive granules in a downwardly hanging position to permit the base adhesive to set is not necessary in the present method of fabricating oriented abrasive material. After the abrasive coated web 32 passes the sizing apparatus 50 the same may be treated in a simplified manner; the nature of the treatment depending upon the type of adhesives used in the liquid base coat and the powdered sizing coat. If heat hardenable synthetic resins are employed the web material may be fed through a heated oven 61 so that the material departing from the curing chamber will be in the nature of a finished abrasive product, or compacted for storage or further curing by arranging the same in the form of a roll 62.

While the preferred method of applying powdered adhesive sizing material is by electrostatic projection, it is to be understood however that other forces may also be utilized to project the dry powdered adhesive upwardly onto the abrasive coated surface. As for example, apparatus of the type generally indicated as 40 in Figure 2 may be employed in place of the electrostatic projecting apparatus indicated generally as 50 for the projection of powdered adhesive onto a freshly applied abrasive coating.

Figure 3 shows diagrammatically another form of apparatus for mechanically projecting powdered adhesive which may replace the electrostatic apparatus indicated generally as 50 in Figure 2. The sizing apparatus of this embodiment comprises a projecting and dispensing nozzle 65 and a chamber 68, provided with an air outlet 69 which may be connected to a conventional "cyclone separator" if desired to facilitate the collection of any excess sizing powder carried off by the air. The powdered sizing adhesive is projected from the nozzle or projector 65 by means of a stream of compressed air introduced in the nozzle by a feed pipe 66. The injector effect of the flow of compressed air from the nozzle draws the powdered adhesive sizing material from a suitable container (not shown) through the duct 67 and into the nozzle 65 from which it is propelled upwardly and into the interstices of the abrasive coated surface.

The foregoing methods of fabricating abrasive coated material including the processes of applying the sizing adhesives thereto permit the manufacture of an abrasive product in such a manner that eliminates the prolonged operation of treating the base adhesive which requires elaborate apparatus and extensive storage space. By employing a suitable adhesive in the base coating and applying an appropriate powdered adhesive for the sizing coat the involved apparatus necessary to treat and cure in previous methods has been eliminated.

We claim:

1. The method of fabricating abrasive coated web material which comprises applying a base coating of liquid adhesive to a surface of the web, applying a layer of abrasive particles to the adhesively coated surface, moving the abrasive coated web into an electrostatic field, moving powdered adhesive sizing material into said electrostatic field, electrostatically dispersing and projecting said powdered adhesive sizing material onto the abrasive coated web prior to curing said base coating of liquid adhesive and thereafter curing both the previously applied liquid adhesive coating and the powdered adhesive coating in one operation.

2. The method of fabricating abrasive coated web material comprising the steps of applying a base coating of liquid adhesive to one surface of the said web material, applying a layer of abrasive granules to the adhesively coated surface, moving the abrasive coated web into an electrostatic field prior to curing said liquid adhesive, moving a powdered adhesive material to a position within the said electrostatic field and adjacent the abrasive coated surface, imparting electrical charges of opposite polarity to said coated web and to said powdered adhesive so that the said powdered adhesive is electrostatically attracted to the said web and retained around the bases of the abrasive particles in a united relation with the base adhesive and thereafter curing both the previously applied liquid adhesive base coating and the powdered adhesive coating in one operation.

3. The method of manufacturing abrasive coated webs comprising the steps of applying a base coating of wet adhesive to a moving web, supporting said adhesive coated web with its adhesive coated surface downward, projecting elongated abrasive granules against said wet adhesive coated surface while orienting them to hang downwardly from said web, moving the abrasive coated web into an electrostatic field while the abrasive coated surface is maintained in a downward facing position, moving powdered adhesive sizing material into said electrostatic field and electrostatically projecting said powdered adhesive sizing material onto the abrasive coated web prior to setting of said wet adhesive and thereafter curing both the wet base coating of adhesive and the powdered adhesive sizing coating simultaneously.

4. The method of manufacturing abrasive coated sheet material which comprises coating a surface of the sheet material with a liquid adhesive, applying a layer of abrasive granules to the adhesively coated surface, projecting a layer of dry pulverized adhesive material onto the abrasive coated sheet prior to setting the said liquid adhesive and thereafter curing both the layer of liquid adhesive and the powdered adhesive sizing coating in one operation.

RAYMOND C. BENNER.
ROMIE L. MELTON.